Patented Apr. 8, 1952

2,592,443

UNITED STATES PATENT OFFICE 2,592,443

ALKYL ESTERS OF AMINOCARBOTHIOLIC ACIDS

Carl S. Marvel, Urbana, Ill., and Ralph E. Miegel, Wilmington, Del., assignors to E. I. du Pont de Nemours & Company, Wilmington, Del., a corporation of Delaware No Drawing. Application December 3, 1948, Serial No. 63,438

5 Claims. (Cl. 260—455)

This invention relates to esters of alpha-aminocarbothiolic acids and more particularly to esters of alpha-aminocarbothiolic acids in which the thiolester linkage forms a part of an open chain.

This invention has as an object the preparation of new compounds. A further object is the preparation of new intermediates. Other objects will appear hereinafter.

These objects are accomplished by the invention wherein the hydrochloride of the chloride of an alpha-primarymonoaminoalkanoic acid of not more than ten carbons wherein the alpha carbon is free from hydrogen is reacted with an alkanethiol and thereafter the alpha-aminocarbothiolic acid ester hydrochloride is reacted with a base to form the alpha-aminocarbothiolic acid ester.

In one method of preparation of the esters of this invention the hydrochloride of the alpha-amino acid chloride is reacted with a molar excess of the thiol under the influence of heat. When the reaction is complete, the excess thiol is removed by distillation and the product is treated with an excess of cold 10% aqueous sodium hydroxide solution and then extracted with diethyl ether. After removal of the ether, the alpha-aminocarbothiolic acid ester is fractionally distilled under reduced pressure.

The following examples in which parts are by weight are illustrative of the invention.

EXAMPLE I

*Alpha-amino-alpha-methylpropionyl chloride hydrochloride*

Into a reaction vessel fitted with a mechanical stirrer and a reflux condenser there was placed 20 g. (0.19 mole) of alpha-amino-alpha-methylpropionic acid and 215 cc. of acetyl chloride. Means were applied to exclude moisture from the reaction mixture, stirring was started and the reaction vessel cooled to about 5° C. Forty-eight grams (0.23 mole) of freshly ground phosphorus pentachloride was added to the reaction mixture which was stirred at ice-bath temperature for 30 minutes. An additional 2.0 g. of phosphorus pentachloride was then added and stirring was continued at room temperature for 3 hours. The finely divided solid product was collected on a filter in a dry atmosphere, the product was washed with a small amount of acetyl chloride and two 40-cc. portions of petroleum ether. After drying under vacuum, 30.4 grams of alpha-amino-alpha-methylpropionyl chloride hydrochloride, a white crystalline solid was obtained.

ANALYSIS

Calculated for $C_4H_9ONCl_2$: N, 8.87%; Cl, 44.9%.
Found:  N, 9.06%;    Cl, 43.50%
        9.26%           43.23%
                        43.51%

*Ethyl alpha-amino-alpha-methylthiolpropionate*

Thirty-eight and two-tenths grams (0.242 mole) of alpha-amino-alpha-methylpropionyl chloride hydrochloride and 140 cc. (117 grams; 1.87 mole) of ethanethiol were refluxed for 3 hours. A 50-cc. portion of benzene was added and refluxing was continued for ½ hour. The excess thiol was removed by distillation and the solid residue in the reaction vessel was treated with excess cold 10% sodium hydroxide solution and then extracted with ether. The liquid layers were separated and the oily layer, after removal of the ether, was fractionally distilled under reduced pressure. Nineteen and four-tenths grams (53% of theoretical) of ethyl alpha-amino-alpha-methylthiolpropionate was obtained as a liquid boiling at 89–90° C./29.2 mm., refractive index $n_D^{25}$ 1.4815.

ANALYSIS

Calculated for $C_6H_{13}NOS$: C, 48.9%; H, 8.90%; N, 9.52%; S, 21.8%.
Found:  C, 49.22%; H, 9.4%; N, 8.69%; S, 22.60%
        49.11%    9.22%    8.61%    22.60%

A portion of the ester was converted to the corresponding hydrochloride. The product was a solid, M. P. 193–194° C. after recrystallization from benzene.

ANALYSIS

Calculated for $C_6H_{14}NOSCl$: N, 7.62%; S, 17.4%; Cl, 19.3%.
Found:  N, 7.45%;  S, 17.25%;  Cl, 19.39%.
        7.24%     (Parr Bomb)

EXAMPLE II

*Isopropyl alpha-amino-alpha-methylthiolpropionate*

A mixture of 10.7 g. (0.0677 mole) of alphaamino-alpha-methylpropionyl chloride hydrochloride, 15 cc. (15 grams; 0.2 mole) propanethiol-2 and 50 cc. of benzene was heated at 68–72° C. for 48 hours. The reaction mixture was reduced to approximately one-half its volume by distillation at atmospheric pressure and the residue was treated with ice water, diethyl ether, and an excess of 10% sodium hydroxide solution. The liquid layers were separated and the ether layer was dried over anhydrous sodium sulfate. After removal of the ether, the residual liquid was distilled through a Vigreux column under reduced pressure. Five and seventeen hundredths grams (47% of theoretical) of isopropyl alpha-amino-alpha-methylthiolpropionate was obtained boiling at 60–61° C./4 mm. A refractive index determination gave $n_D^{25}$ 1.4767.

ANALYSIS

Calculated for $C_7H_{15}NOS$: C, 52.2%; H, 9.32%; N, 8.69%; S, 19.88%.

Found: C, 53.49%; H, 9.25%; N, 8.65%; S, 20.34%
53.02%   9.57%   8.51%   20.74%
52.83%   9.65%   8.38%

A portion of this ester was converted to the corresponding hydrochloride, M. P. 160–162, after recrystallization from benzene.

ANALYSIS

Calculated for $C_7H_{16}NOSCl$: Cl, 17.94%; N, 7.08%; S, 16.18%.

Found: Cl, 17.61%; N, 6.96%; S, 15.79%
              6.92%   (Parr Bomb)

EXAMPLE III

*Methyl alpha-amino-alpha-methylthiolpropionate*

A mixture of 67.9 grams of alpha-amino-alpha-methylpropionyl chloride hydrochloride, 250 ml. of benzene was stirred at about 35° C. and 100 grams of methanethiol was added to the reaction mixture over a period of one hour. Stirring was continued for an additional hour during which time the reaction mixture was maintained at 45° C. At the end of this time there was added excess 25% aqueous sodium hydroxide solution and 1.5 pounds of diethyl ether. The liquid layers were separated, and the ether layer was dried over anhydrous sodium sulfate. After removal of the ether the residual liquid was distilled through a Vigreux column under reduced pressure. Three and eight-tenths (3.8) grams of methyl alpha-amino-alpha-methylthiolpropionate was obtained boiling at 84–87° C./32.5 mm. of mercury pressure.

A small portion of the etheral solution obtained above was treated with gaseous hydrogen chloride under anhydrous conditions. The white, crystalline methyl alpha-amino-alpha-methylthiolpropionate hydrochloride so obtained was insoluble in boiling benzene, dioxane and ether. It gave no indication of melting but gradually darkened at about 230° C.

ANALYSIS

Calculated for $C_5H_{12}NOSCl$: N, 8.26%; Cl, 20.94%.
Found: N, 7.93%; Cl, 20.35%.

In preparing the open chain esters of the alpha-amino-monocarbothiolic acids of this invention there can be employed alpha-primarymonoaminoalkanoic acid of up to ten carbons wherein the alpha carbon is hydrogen free. Thus, there may be employed DL-alpha-amino-alpha-methylpropionyl chloride hydrochloride. These monoamino-monocarboxylic acid chloride hydrochlorides may be prepared as illustrated in Example I using essentially the method of E. Fischer, Ber. 38, 605 (1905).

The esters can be formed as illustrated by the examples by employing any alkanethiol of one to eight carbons. Thus there may be employed methanethiol, ethanethiol, propanethiol-1, propanethiol-2, butanethiol-1, butanethiol-2, 2-methylpropanethiol-2, 2-methylpropanethiol-1, octanethiol-1 and the thiols derived from the addition of hydrogen sulfide to unsaturated petroleum hydrocarbons such as diisobutylene.

This invention is generic to the alkyl esters of alpha-primarymonoaminoalkanoic acids wherein the alkyl group is of one to eight carbons and the aminoalkanoic acid is of up to ten carbons and has a hydrogen free alpha carbon, including, for example, the esters of alpha-amino-alpha-methylthiolpropionic, alpha-amino-alpha,alpha-diethylthiolacetic, and DL-alpha-amino-alpha-methylthiolbutyric acids. Included in these preferred alpha-amino-monocarbothiolic acid esters are the methyl, ethyl, propyl, isopropyl, secondary butyl, butyl, isobutyl, normal octyl esters of alpha-amino-alpha-methylthiolpropionic, and DL-alpha-amino-alpha-methylthiolbutyric acids. The thiolesters derived from alpha-amino acids having no hydrogen on the alpha carbon are more stable than the thiolesters derived from alpha-amino acids having hydrogen on the alpha carbon.

The reaction may be carried out in an inert solvent such as benzene or ether although when either the reaction mixture or reaction product is liquid, a solvent is not required. The reaction sometimes takes place at room temperature, but mild heating in the range 40–100° C. accelerates the esterification and is therefore advantageous. The top limit of heating is, of course, the decomposition point of reactants or product. The choice of the proper conditions for any given set of reactants is readily determined by one skilled in the art.

In the step of the process for converting the hydrochloride of the alpha-aminocarbothiolic acid ester to the free alpha-aminocarbothiolic acid ester, any convenient hydrolyzing agent can be used, such as mild alkali, e. g., alkaline earth hydroxides, alkali carbonates or dilute alkali hydroxides.

The compounds of this invention are useful as insecticides, soil fumigants, fungicides, pharmaceuticals and can be used as intermediates in the preparation of polymeric compounds and pharmaceuticals.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Ethyl alpha-amino-alpha-methylthiolpropionate.

2. Isopropyl alpha-amino-alpha-methylthiolpropionate.

3. Methyl alpha-amino-alpha-methylthiolpropionate.

4. An alkyl alpha-amino-alpha-methylthiolpropionate wherein the alkyl group is of one to eight carbons.

5. An alkyl ester of a wholly aliphatic alpha-aminocarbothiolic acid in which ester the alkyl group is of one to eight carbons and the carbothiolic acid is of not more than ten carbons, has a hydrogen-free alpha carbon, and is, apart from the one amino and one carbothiolic group, saturated aliphatic hydrocarbon.

CARL S. MARVEL.
RALPH E. MIEGEL.

REFERENCES CITED

The following references are of record in the file of this patent:

UNITED STATES PATENTS

| Number | Name | Date |
| --- | --- | --- |
| 2,090,756 | Hansen et al. | Aug. 24, 1937 |

OTHER REFERENCES

Pollak et al.: "Monatshefte fur Chemie," vol. 58 (1931), pp. 129, 133.

Ehrensvard: "Nature," vol. 159 (1947), p. 500.